United States Patent [19]

Cole, Jr.

[11] 4,179,153
[45] Dec. 18, 1979

[54] TOOL BOX CARRYING APPARATUS AND METHOD

[76] Inventor: Bert Cole, Jr., 1353 W. French Pl., San Antonio, Tex. 78201

[21] Appl. No.: 892,669

[22] Filed: Apr. 3, 1978

[51] Int. Cl.² .................. B60R 5/00; B60R 7/00; B23P 19/00
[52] U.S. Cl. .................... 296/37.1; 29/150; 29/401.1; 29/428; 29/526 R
[58] Field of Search ............ 29/428, 526 R, 401 B, 29/150; 296/24 R, 37.1, 37.6

[56] References Cited

U.S. PATENT DOCUMENTS

| | | | |
|---|---|---|---|
| 1,368,432 | 2/1921 | Hahn | 296/37.1 X |
| 1,726,398 | 8/1929 | Limbocker | 296/37.1 |
| 1,798,930 | 3/1931 | Davis | 296/37.1 |
| 3,231,292 | 1/1966 | Lorenz | 296/37.1 X |
| 3,309,759 | 3/1967 | Vittone | 29/155 R |
| 3,664,704 | 5/1972 | Ellis | 296/24 R |
| 3,704,926 | 12/1972 | Wariner | 296/37.1 X |
| 3,730,582 | 5/1973 | Lieffring | 29/401 B X |
| 3,776,591 | 12/1973 | Krueger | 29/428 X |
| 4,099,313 | 7/1978 | Phillips | 29/428 X |

FOREIGN PATENT DOCUMENTS 317251 8/1929 United Kingdom .................. 296/37.1

*Primary Examiner*—Charlie T. Moon
*Attorney, Agent, or Firm*—Gunn & Lee

[57] ABSTRACT

A tool box carrying apparatus is shown wherein a tool box may be mounted under the hood of an automobile having a truck type front. A window washing bottle normally connected to the side wall of the automobile is disconnected, and a side of the tool box carrying apparatus is connected in the location where the window washing bottle was formerly connected. A bracket is connected to the bottom rear of the tool box carrying apparatus and extends generally downward to connect to the wheel well. Another bracket connects to the front bottom of the tool box carrying apparatus and extends generally upward to connect to the front wall of the automobile. The tool box carrying apparatus may be formed integral with the tool box or as a separate unit wherein the tool box is strapped into the carrying apparatus. The window washing bottle is connected to a side of the tool box carrying apparatus adjacent the automobile engine.

11 Claims, 4 Drawing Figures

TOOL BOX CARRYING APPARATUS AND METHOD

BACKGROUND OF THE INVENTION

This invention relates to a tool box carrying apparatus and, more particularly, to a tool box carrying apparatus that may be located under the hood of an automobile having a truck type front. The carrying apparatus is bolted to the side wall of the automobile, and has special brackets extending downward from the bottom thereof to connect to the wheel well and upward to connect to the front wall of the automobile. A window washing bottle is relocated on the side of the carrying apparatus adjacent the automobile engine.

BRIEF DESCRIPTION OF THE PRIOR ART

Applicant is a sportsman who enjoys outdoor sports, such as camping and/or hunting. On many of applicant's hunting trips, he will drive his Chevrolet Blazer automobile with all of the camping equipment and gear being located in the rear. On a recent hunting trip, the tool box was needed from the Blazer automobile. However, as is normally the case the tool box was located in the front rear portion of the Blazer which necessitated the unloading of almost all of the camping and hunting gear from the Blazer prior to reaching the tool box. As a result of this experience and similar experiences, applicant determined there was a need for ready accessibility to the tool box without regard to the loading in his automobile. After considerable efforts in finding a suitable location for the tool box, applicant determined there was sufficient space under the hood of an automobile having a truck type front end for the tool box. By the moving of the window washing bottle from the side wall above the wheel well of his automobile, applicant was able to locate the tool box above the wheel well and under the hood of the automobile. Therefore, the tool box would always be accessible by simply releasing the hood from inside the automobile so that the tool box can be reached upon opening the hood.

The securing of the tool box or a suitable carrying apparatus necessitated the manufacturing of special purposes brackets and/or supports for the tool box. First, the tool box is connected to the side wall of the automobile at the place normally occupied by the window washing bottle. Next, the tool box is attached to the wheel well by a suitable bracket that extends generally downward with a lower mating flange that abuts the wheel well. A front bracket which extends generally horizontal to connect below the tool box or tool box carrying apparatus also extends generally upward to connect to a front wall or front cross beam of the automobile. The window washing bottle is reconnected to the lower bracket by an outwardly and upwardly extending flange in the same manner as it was previously connected to the side wall of the automobile.

The carrying apparatus and tool box may be formed either separately or as an integral unit depending upon the needs for the particular situation.

SUMMARY OF THE INVENTION

It is an object of the present invention to provide a tool box carrying apparatus that may be located under the hood of an automobile having a truck type front.

It is another object of the present invention to provide a means for attaching a tool box carrying apparatus including securing the apparatus to the side wall of the automobile in a position formerly occupied by a window washing bottle, securing a lower rear of the tool box carrying apparatus by means of a bracket to the wheel well, securing a front bottom of the apparatus to a front wall of the automobile, and repositioning the window washing bottle by securing it to an outwardly and upwardly extending flange portion of the rear bracket. The rear lower bracket has a generally horizontal upper portion and a generally vertical upper portion for attaching the window washing bottle thereto. The rear lower bracket also has an inwardly directed lower flange portion for abutting and connecting to the wheel well. The front upper bracket has a generally horizontal extending lower flange for butting and connecting to the bottom of the carrying apparatus with an upper portion of the bracket being bolted to a front wall or front cross beam of the automobile.

The tool box and carrying apparatus may be formed as one integral unit, or as separate units with an appropriate means for securing the tool box to the carrying apparatus. An appropriate securing means can include a releaseable strap attached to each side of the carrying apparatus. In the event that the tool box sets in the carrying apparatus, an appropriate abrasive stripping may be bonded to the bottom of the carrying apparatus to prevent sliding of the tool box when located thereon.

DESCRIPTION OF THE PREFERRED EMBODIMENT

Figure 1:
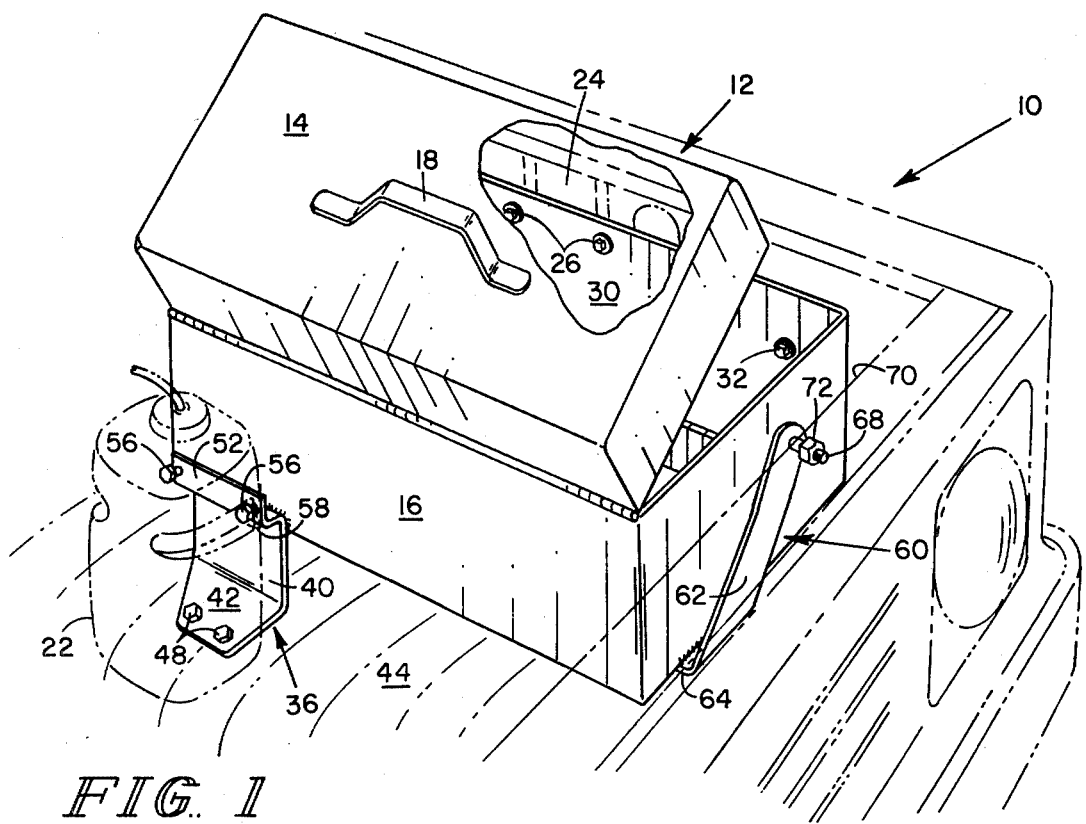
FIG. 1 is an environmental view showing an apparatus for mounting a tool box under the hood of an automobile having a truck type front.
Figure 2:
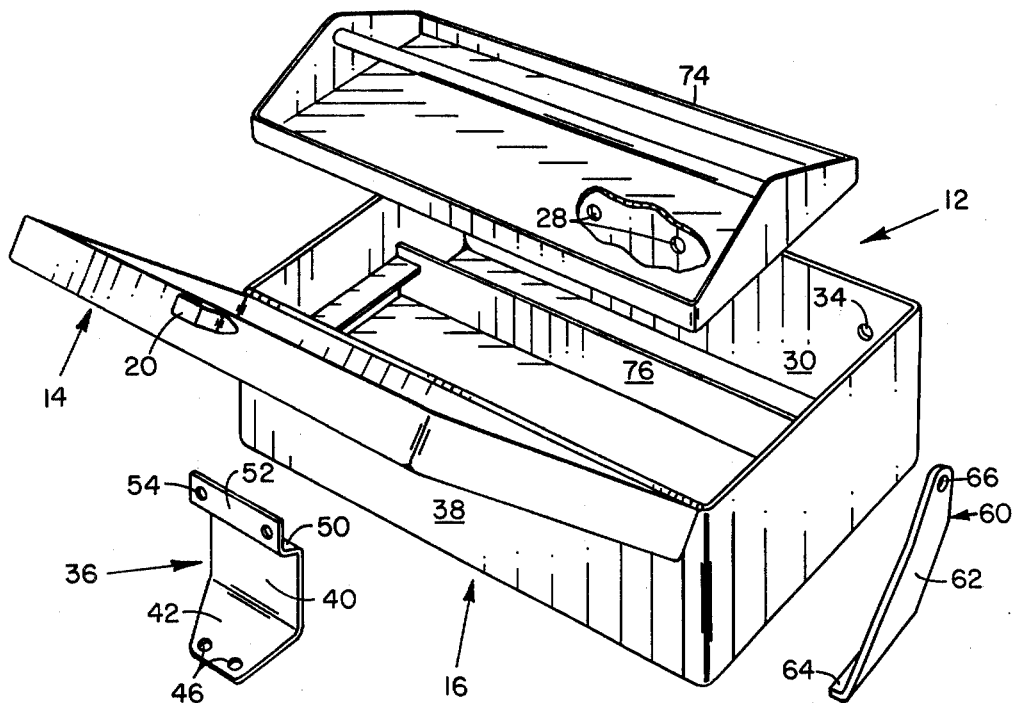
FIG. 2 is an exploded perspective view of the tool box and mounting apparatus shown in FIG. 1.

Referring to FIG. 1 of the drawings, there is shown an automobile 10 having a truck type front. Mounted under the hood of the automobile 10 is located a tool box 12 having a top 14 pivotally connected to a lower box portion 16. The top 14 has a handle 18 and a latch 20 (see FIG. 2) for connecting to the lower box portion 16.

Normally in an automobile 10 having a truck type front, a window washing bottle 22 is connected to a side wall 24 by means of bolts 26. By removing bolts 26, and disconnecting the window washing bottle 22, the tool box 12 may be secured in place thereof by bolts 26. The tool box 12 is first secured by bolts 26 extending through holes 28 (see FIG. 2) in vertical plate 30 of tool box 12 and threadably connecting to side wall 24 of automobile 10. To give additional strength to the connection, bolt 32 also connects through hole 34 in vertical plate 30 to threadably connect with side wall 24.

A second securing of the tool box 12 is provided by a lower rear bracket 36 is connected to the tool box 12 by any suitable means. In this preferred embodiment the lower rear bracket 36 is connected to vertical plate 38 by welding, but other means of connection could be used. The lower rear bracket 36 has a vertical portion 40 terminating in a downwardly and inwardly extending flange 42 that abuts wheel well 44. Holes 46 in flange 42 receive bolts 48 therethrough for threadably connecting to the wheel well 44 to support the inside rear portion of tool box 12. The upper part of lower rear bracket 36 has a horizontal portion 50 extending outward from tool box 12 and terminating in a vertical portion 52. The vertical portion 52 has holes 54 therein for receiving bolts 56 therethrough. Bolts 56 also extend through a connecting lip 58 of window washing bottle 22 to secure the window washing bottle to the lower rear bracket 36. Normally, window washing bottle 22 is formed from plastic with the connecting lip 58 simply being a convenient economic means for connection to the automobile. The space provided by the horizontal portion 50 allows the bolts to be secured in position by suitable nuts and lock washers.

A front upper bracket 60 has a generally vertical portion 62 extending upward therefrom. A lower horizontal flange 64 extends under the front of the lower box portion 16 of the tool box 12. The front upper bracket 60 may be connected by any suitable means to the tool box 12, such as welding of the lower horizontal flange 64 to the bottom of the tool box 1e. The upper portion of the front upper bracket 60 has a hole 66 therethrough for receiving bolt 68. Bolt 68 connects to front wall 70 of automobile 10 by means of nut 72. The front upper bracket 60 helps support the weight of the tool box 12 by attachment to the front wall 70 in the manner just described.

The tool box 12 may be of any conventional type, such as a tool box that has a removable tray 74 located therein and a socket retaining plate 76 in the lower box portion 16.

Figure 3:
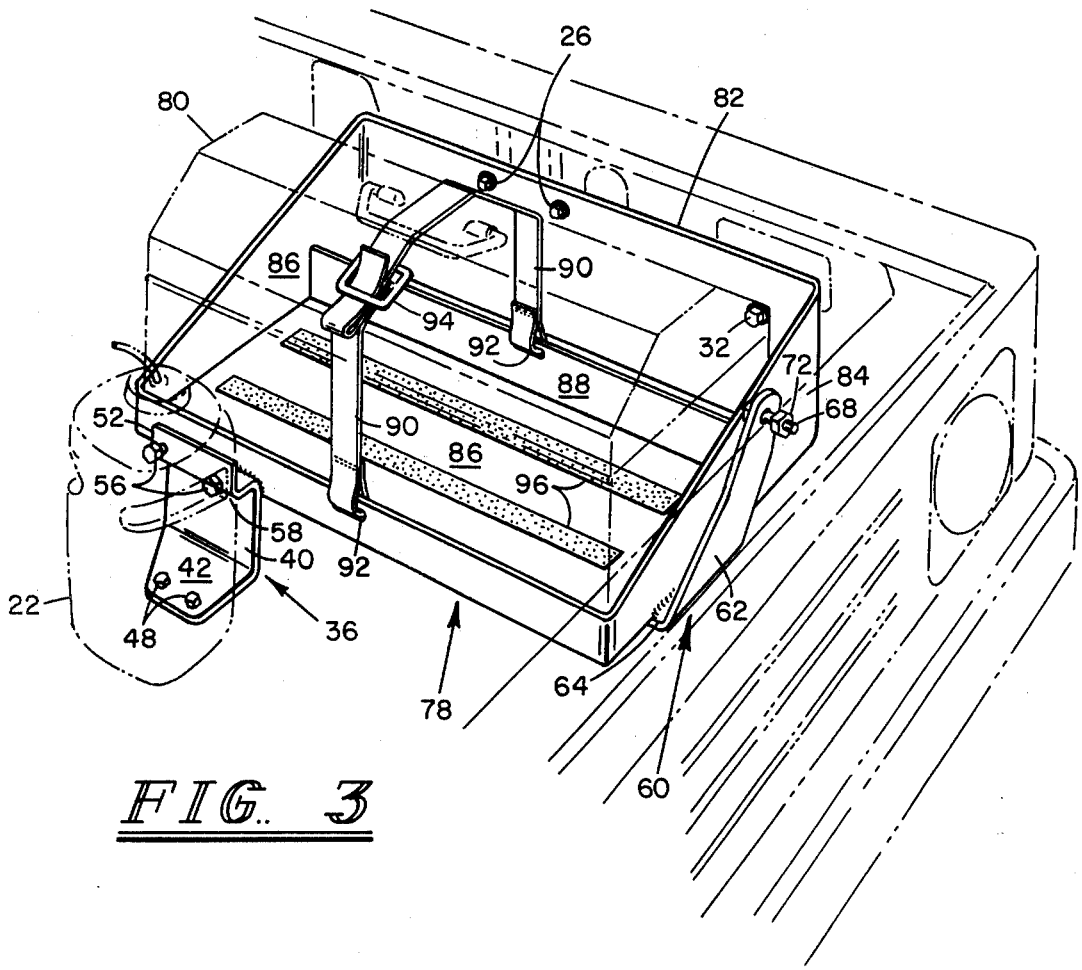
FIG. 3 is an alternative embodiment showing an environmental view of a tool box carrying apparatus for mounting under the hood of an automobile having a truck type front.
Figure 4:
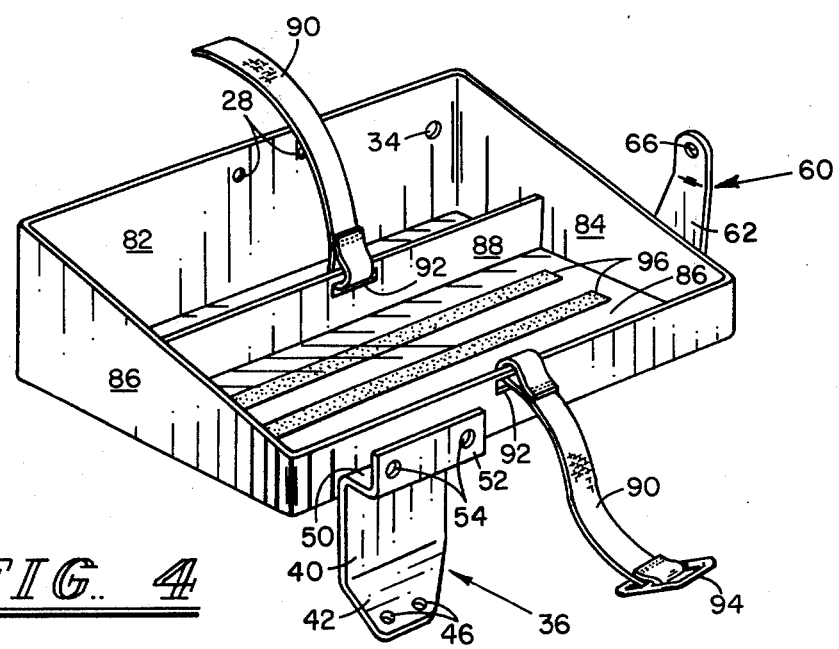
FIG. 4 is a perspective view of the carrying apparatus shown in FIG. 1.

Referring now to FIGS. 3 and 4 of the drawings in combination, an alternative embodiment is shown. In the alternative embodiment, a tray is specifically designed for carrying a tool box, such as tool box 80, therein. The tray 78 uses brackets 36 and 60 the same as the preferred embodiment. However, the tray 78 has a vertical outside plate 82 that has holes 28 and 34 therein for receiving bolts 26 and 32 therethrough to connect to the side wall 24 of the automobile 10. Again, the brackets 36 and 60 may be connected by any suitable means, such as welding. The tray 78 has sloped end plates 84 and 86 to allow for ease of inserting or removing tool box 80. The tool box 80 is located in compartment 86 of tray 78 which is formed by dividing wall 88. To hold the tool box 80 in position, straps 90 are connected through slots 92 in the tray 78. Upon placing the tool box 80 in position, straps 90 are fastened by means of buckle 94 to securely hold the tool box 80 in position. Abrasive strips 96 in the bottom of compartment 86 securely maintain the tool box 80 in position and prevents it from slipping inside of compartment 86. Again, the window washing bottle 22 may be connected to bracket 36 as previously described in the preferred embodiment.

By use of the alternative embodiment as described in conjunction with FIGS. 3 and 4, the tool box 80 may be located under the hood of an automobile having a truck type from, yet may still be removed and carried to the location where the tools may be used. It should be realized that the present invention is designed for use in conjunction with an automobile that has suitable spacing above the wheel wells for the location of a tool box thereabove.

I claim:

1. A method of mounting a tool box under a hood of an automobile having a pickup type front comprising the following steps:

removing a window washing bottle from a side wall of said automobile;
   first attaching a side of an elongated carrying means to said side wall of said automobile where said window washing bottle was formerly located;
   second attaching an end of said elongated carrying means to a front end wall of said automobile;
   third attaching a bottom of said elongated carrying means to a wheel well of said automobile; and
   relocating said window washing bottle under said hood.

2. The method as given in claim 1 wherein said relocation step includes connecting said window washing bottle to said elongated carrying means.

3. The method as given in claim 2 wherein said tool box and said elongated carrying means are made as an integral unit.

4. The method as given in claim 2 includes an additional step of securing said tool box in said elongated carrying means by securing means.

5. The method as given in claim 2 wherein said second attaching and third attaching steps includes connecting mounting brackets between said elongated carrying means and said front end wall and said wheel well, respectively, of said automobile.

6. An apparatus for mounting a tool box under a hood of an automobile having a pickup truck type front comprising:

tool box carrying means having a box like structure with box sides and a bottom;
   securing means connecting a first of said box sides of said tool box carrying means to a side wall of said automobile;
   first bracket means connecting to a front of said bottom of said tool box carrying means and extending generally upward to connect to a front wall of said automobile;
   second bracket means connecting to a rear of said bottom of said tool box carrying means and extending generally downward to connect a wheel well of said automobile; and
   means for amounting adjacent to a second of said box sides of said tool box carrying means said means for mounting being adapted to secure a window washing bottle to said tool box carrying means.

7. The apparatus as given in claim 6 wherein said second bracket means includes a lower flange flared inward to abut said wheel well while connecting thereto, and an upper flange with a generally horizontal portion and a generally vertical portion adjacent said tool box carrying means, said generally vertical portion forming a part of said means for mounting.

8. The apparatus as given in claim 7 wherein said first bracket means includes a lower lip extending generally horizontal below said bottom front of said tool box carrying means, an upper tip of said second bracket means being secured to said front wall of said automobile by first bolt means.

9. The apparatus as given in claim 8 wherein said securing means includes second bolt means connecting to said side wall of said automobile and extending through said first box side of said tool box carrying means.

10. The apparatus as given in claim 9 wherein said tool box and said tool box carrying means form an integral unit.

11. The apparatus as given in claim 9 further including strap means with each end thereof being connecting to opposite box sides of said tool box carrying means, said strap means having buckle means for securing said tool box in said tool box carrying means.

* * * * *